(12) United States Patent
Kuzuhara (10) Patent No.: US 10,473,927 B2
(45) Date of Patent: *Nov. 12, 2019

(54) DISPLAY APPARATUS AND DISPLAY UNIT

(71) Applicant: Panasonic Intellectual Property Management Co., Ltd., Osaka (JP)

(72) Inventor: Satoshi Kuzuhara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/083,731

(22) Filed: Mar. 29, 2016

(65) Prior Publication Data

US 2016/0209650 A1    Jul. 21, 2016

Related U.S. Application Data

(63) Continuation of application No. PCT/JP2014/006363, filed on Dec. 22, 2014.

(30) Foreign Application Priority Data

Dec. 27, 2013   (JP) .................. 2013-271279

(51) Int. Cl.
*G02B 27/14*   (2006.01)
*G02B 27/10*   (2006.01)
(Continued)

(52) U.S. Cl.
CPC .......... *G02B 27/0101* (2013.01); *B60K 35/00* (2013.01); *G02B 5/10* (2013.01);
(Continued)

(58) Field of Classification Search
CPC .............. G02B 27/0172; G02B 3/0056; G02B 27/0149; G02B 24/144; G02B 27/145;
(Continued)

(56) References Cited

U.S. PATENT DOCUMENTS 4,930,884 A * 6/1990 Tichenor ................ G02B 27/04
359/857
5,121,099 A    6/1992 Hegg et al.
(Continued)

FOREIGN PATENT DOCUMENTS

JP    3-180810    8/1991
JP    5-136743    6/1993
(Continued)

OTHER PUBLICATIONS

International Search Report dated Mar. 17, 2015 in corresponding International Application No. PCT/JP2014/006363.
(Continued)

*Primary Examiner* — Dawayne Pinkney
(74) *Attorney, Agent, or Firm* — Wenderoth, Lind & Ponack, L.L.P.

(57) ABSTRACT

A display apparatus includes a display unit that projects an image to a light transmissive display member. The display unit is configured to accommodate a display device and a projection optical system that projects the image displayed on the display device to the display member in a housing including an opening through which projected light is output. The projection optical system includes a first reflecting member disposed on a display device side and a second reflecting member disposed on an opening side in an optical path extending from the display device to the opening. A reflection surface of the first reflecting member that reflects the image displayed on the display device has a convex shape of a free-form surface, and a reflection surface of the second reflecting member that projects the image to the display member has a concave shape of a free-form surface.

9 Claims, 7 Drawing Sheets

(51) Int. Cl.
  *G02B 27/01* (2006.01)
  *G02B 5/10* (2006.01)
  *B60K 35/00* (2006.01)
  *G03B 21/28* (2006.01)
  *G03B 21/62* (2014.01)
  *H04N 5/64* (2006.01)

(52) U.S. Cl.
  CPC ......... *G02B 27/01* (2013.01); *G02B 27/0149* (2013.01); *G03B 21/28* (2013.01); *G03B 21/62* (2013.01); *G02B 2027/011* (2013.01); *G02B 2027/013* (2013.01); *G02B 2027/014* (2013.01); *G02B 2027/0123* (2013.01); *G02B 2027/0141* (2013.01); *G02B 2027/0181* (2013.01); *H04N 5/64* (2013.01)

(58) Field of Classification Search
  CPC .... G03B 21/56; G03B 21/625; G03B 21/602; B29L 2011/0016; B29D 11/0073
  USPC ........ 359/631, 626, 618–621, 443, 454–455, 359/632, 633, 630, 629
  See application file for complete search history.

(56) References Cited

U.S. PATENT DOCUMENTS

| | | | | |
|---|---|---|---|---|
| 5,880,888 | A * | 3/1999 | Schoenmakers | G02B 17/008 359/629 |
| 8,066,374 | B2 * | 11/2011 | Koschmieder | G02B 17/0621 351/206 |
| 2006/0232853 | A1 * | 10/2006 | Dobschal | G02B 17/0615 359/366 |
| 2008/0238814 | A1 | 10/2008 | Ishikawa et al. | |
| 2011/0317273 | A1 | 12/2011 | Kasai et al. | |
| 2013/0021224 | A1 | 1/2013 | Fujikawa et al. | |
| 2013/0063754 | A1 | 3/2013 | Saisho et al. | |
| 2013/0155521 | A1 | 6/2013 | Shimada et al. | |
| 2015/0098029 | A1 | 4/2015 | Sato et al. | |
| 2015/0268466 | A1 * | 9/2015 | Kanamori | G02B 27/01 345/8 |

FOREIGN PATENT DOCUMENTS

| | | |
|---|---|---|
| JP | 2000-347127 | 12/2000 |
| JP | 2004-226469 | 8/2004 |
| JP | 2008-268883 | 11/2008 |
| JP | 2010-208580 | 9/2010 |
| JP | 2011-209616 | 10/2011 |
| JP | 2012-58294 | 3/2012 |
| JP | 2013-25205 | 2/2013 |
| JP | 2013-61554 | 4/2013 |
| JP | 2013-111999 | 6/2013 |
| JP | 2013-125193 | 6/2013 |
| JP | 2013-228442 | 11/2013 |

OTHER PUBLICATIONS

Written Opinion of the International Searching Authority dated Mar. 17, 2015 in corresponding International Application No. PCT/JP2014/006363.

* cited by examiner

DISPLAY APPARATUS AND DISPLAY UNIT

BACKGROUND

1. Technical Field

The present technology relates to a display apparatus that enables a virtual image of a display image to be visually perceived by projecting the display image to a light transmissive display member.

2. Description of Related Art

Unexamined Japanese Patent Publication No. 2013-25205 discloses a headup display including a curved screen that corrects a field curvature of a virtual image. Unexamined Japanese Patent Publication No. 2013-111999 discloses a headup display that divides a display image into two screens and displays the display image.

SUMMARY

A display apparatus according to the present technology includes a display unit that projects an image to a light transmissive display member, and the display apparatus forms a virtual image of the image projected by the display unit on an opposite side to a user side with respect to the display member. The display unit is configured to accommodate a display device that displays the image and a projection optical system that projects the image displayed on the display device to the display member in a housing including an opening through which projected light is output. The projection optical system includes a first reflecting member disposed on a display device side and a second reflecting member disposed on an opening side in an optical path extending from the display device to the opening. A reflection surface of the first reflecting member that reflects the image displayed on the display device has a convex shape of a free-form surface, and a reflection surface of the second reflecting member that projects the image to the display member has a concave shape of a free-form surface.

DESCRIPTION

Hereinafter, a display unit and a display apparatus according to an exemplary embodiment of the present technology will be described with reference to the drawings. However, a detailed description more than necessary may occasionally be omitted. For example, the detailed description of a well-known item and the overlapping description of a substantially identical configuration may occasionally be omitted. This is to avoid the following description from becoming unnecessarily redundant, and to ease understanding of those skilled in the art. Note that, the inventor provides the accompanying drawings and the following description in order that those skilled in the art adequately understand the present technology and does not intend to limit the subject matter described in the claims by the accompanying drawings and the following description.

Figure 1:
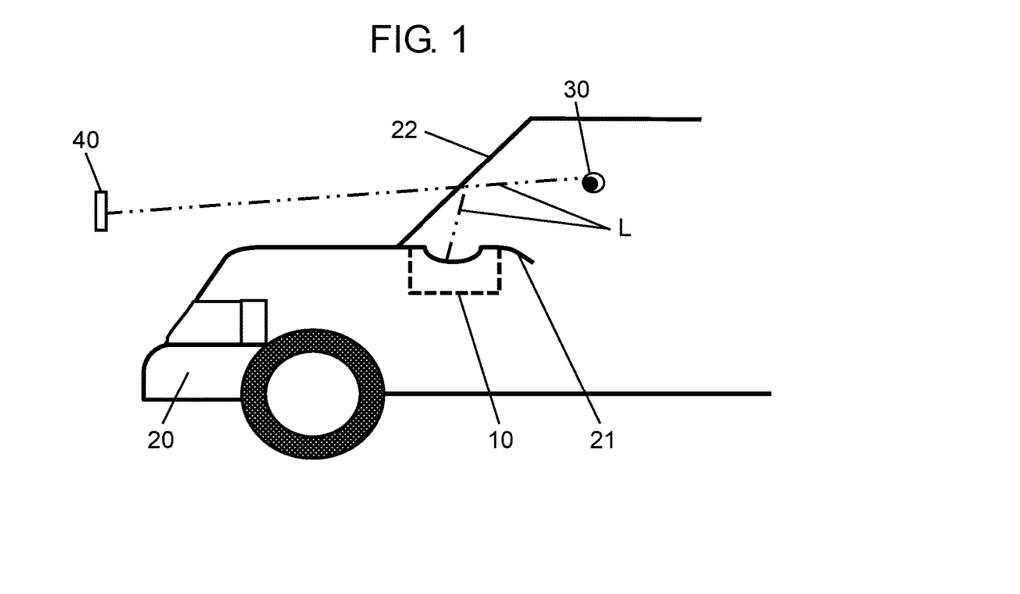
FIG. 1 is an explanatory view illustrating a configuration of an on-vehicle display apparatus provided with a display unit according to an exemplary embodiment of the present technology.

FIG. 1 is an explanatory view illustrating a configuration of an on-vehicle display apparatus provided with a display unit according to an exemplary embodiment of the present technology.

As illustrated in FIG. 1, in the on-vehicle display apparatus of the exemplary embodiment, display unit 10 that projects an image is disposed in dashboard 21 of vehicle 20. Display unit 10 projects the image to wind shield 22 that is a light transmissive display member disposed in vehicle 20, thereby forming virtual image 40 of the image projected by display unit 10 on an opposite side to a side of user 30 with respect to wind shield 22. User 30 can visually perceive virtual image 40 of the image projected by display unit 10 through wind shield 22. Center optical path L of the projected image is indicated by an alternate long and two short dashes line in FIG. 1, and also in the following description, center optical path L is indicated by the alternate long and two short dashes line in the drawings.

Figure 2:
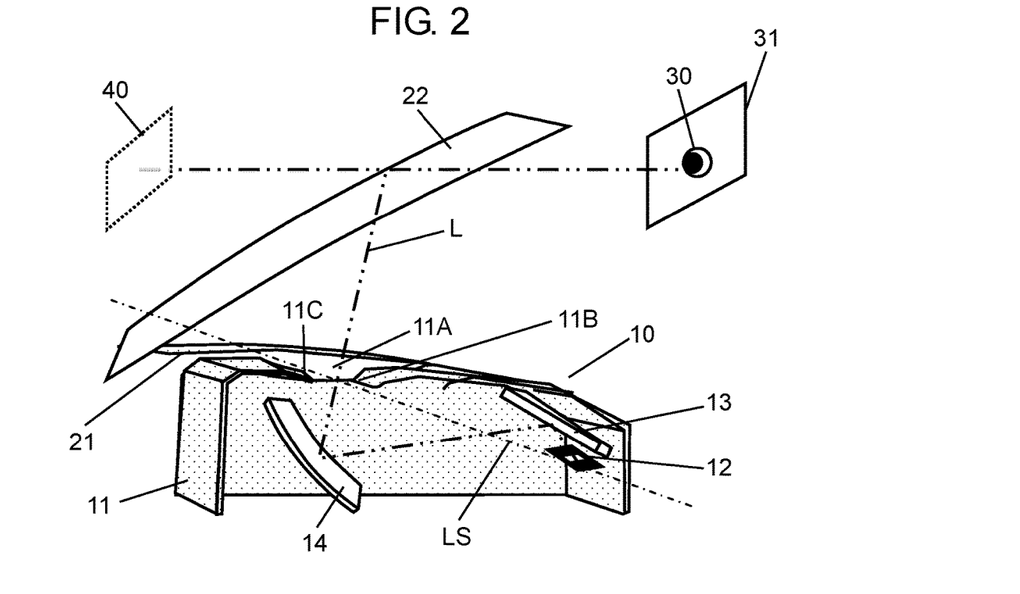
FIG. 2 is a perspective view illustrating a configuration of the display unit used in the on-vehicle display apparatus.
Figure 3:
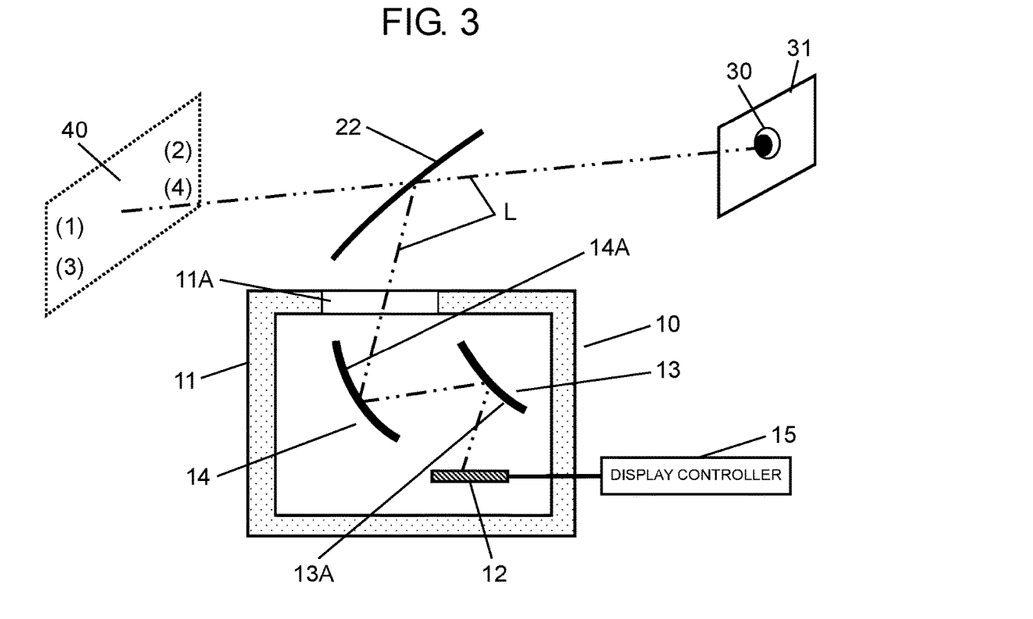
FIG. 3 is an explanatory view illustrating a schematic configuration of the display unit.

FIG. 2 is a perspective view illustrating a configuration of the display unit used in the on-vehicle display apparatus. FIG. 2 illustrates the display unit with a housing of the display unit partially cut. FIG. 3 is an explanatory view illustrating a schematic configuration of the display unit.

As illustrated in FIGS. 2 and 3, in display unit 10 of the exemplary embodiment, display device 12 that displays the image and a projection optical system that projects the image displayed on display device 12 to wind shield 22 that is the display member are accommodated in housing 11 including opening 11A. Therefore, user 30 can visually perceive virtual image 40 of the image through wind shield 22 of the display member. User 30 can visually perceive virtual image 40 of the image projected to wind shield 22 of the display member from eye box 31 that is a previously-assumed visually recognizable region.

Opening 11A of housing 11 constitutes an outgoing port of projected light of the projection optical system. In opening 11A of housing 11, a light transmissive cover such as a transparent resin sheet may be disposed so as to close opening 11A.

For example, a liquid crystal display apparatus, an organic EL display apparatus, and a plasma display are used as display device 12. In display device 12, a predetermined image is displayed in a display region of display device 12 using an image signal input from display controller 15.

The projection optical system includes first mirror 13 and second mirror 14 in an optical path from display device 12 to wind shield 22 of the display member. First mirror 13 is a first reflecting member disposed on the side of display device 12. Second mirror 14 is a second reflecting member disposed on the display member side, namely, on the side of opening 11A through which the projected light for the image displayed on display device 12 is output.

As illustrated in FIG. 2, in housing 11 of display unit 10, opening 11A through which the projected light is output includes first end 11B that is formed in a rim on the side of first mirror 13 of opening 11A and second end 11C that is formed in a rim on the side of second mirror 14 of opening 11A. Display device 12 is disposed such that the display region where the image is displayed is located on the side of first mirror 13 with respect to straight line LS connecting first end 11B and second end 11C. Therefore, even if the light is incident on display unit 10, the incidence of the light on the display region of display device 12 can be restrained to form high-quality virtual image 40.

Figure 4:
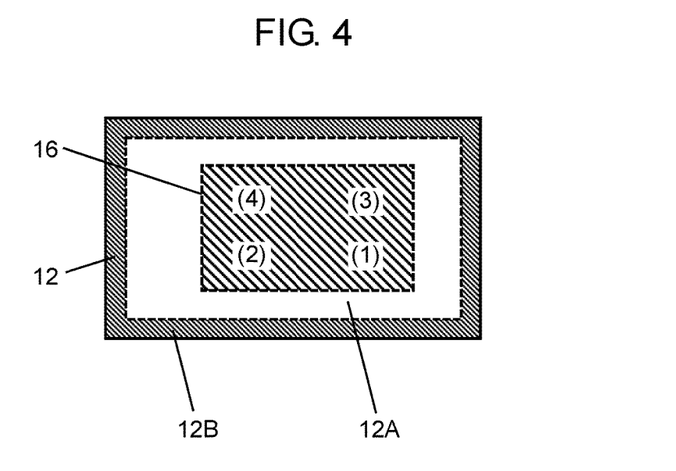
FIG. 4 is a plan view illustrating a display surface of a display device.

FIG. 4 is a plan view illustrating a display surface of the display device. As illustrated in FIG. 4, rectangular display device 12 includes rectangular display region 12A where predetermined image 16 is displayed using the image signal input from display controller 15 and non-display region 12B that is formed around display region 12A. Image 16 displayed on display device 12 becomes a vertically- and horizontally-reversed image with respect to virtual image 40 displayed by display unit 10. Marks (1), (2), (3), and (4) indicating positions of virtual image 40 in FIG. 3 and marks (1), (2), (3), and (4) indicating positions of image 16 in FIG. 4 show that image 16 displayed on display device 12 becomes the inverted image with respect to virtual image 40 formed by display unit 10.

Display controller 15 controls the image signal input to display device 12, which enables the display positions of image 16 to be changed in display region 12A.

Figure 5:
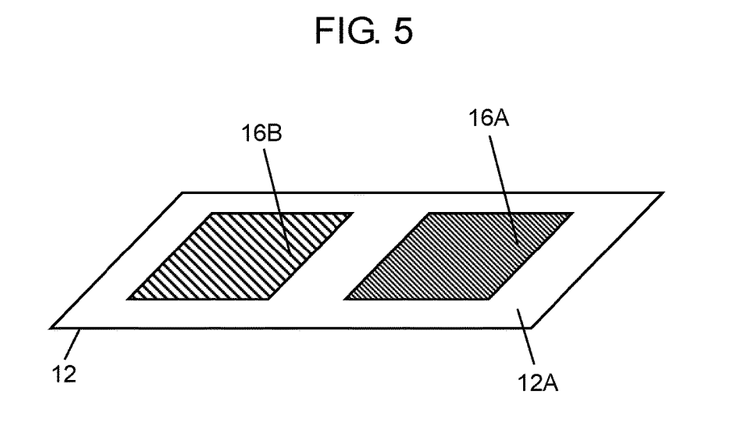
FIG. 5 is an explanatory view illustrating the case that a display position of an image displayed on the display device is changed.
Figure 6:
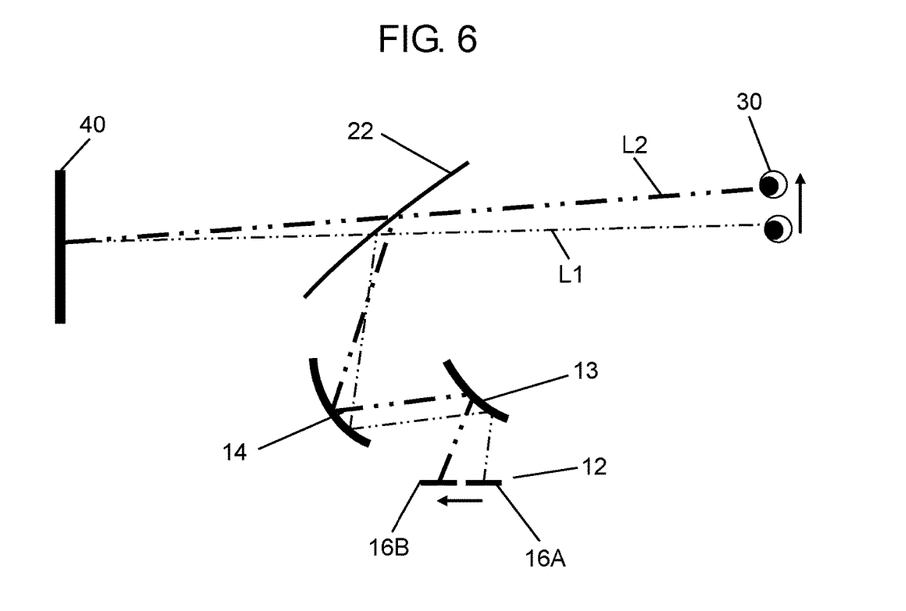
FIG. 6 is an explanatory view illustrating a change of the image projected by a projection optical system by changing the display position of the image displayed on the display device.

FIG. 5 is an explanatory view illustrating the case that the display position of the image displayed on the display device is changed. FIG. 6 is an explanatory view illustrating a change of the image projected by the projection optical system by changing the display position of the image displayed on the display device.

As illustrated in FIG. 5, display controller 15 controls the image signal, which enables the image displayed on display device 12 to be changed from display position 16A to display position 16B. Note that, display positions 16A and 16B are not limited to the two places, but display controller 15 can set display positions 16A and 16B to arbitrary positions.

As illustrated in FIG. 6, when display position 16A of the image is controlled so as to be changed to display position 16B, the center optical path of the projected image is changed from L1 to L2, thereby changing the position of a viewpoint of user 30 who visually perceives virtual image 40.

That is, in display unit 10 of the exemplary embodiment, the position where the image is displayed on display device 12 can be changed by controlling display controller 15, and user 30 can visually perceive proper virtual image 40 according to the position of the viewpoint of user 30. For example, an attachment error of display unit 10 is generated when display unit 10 is installed on vehicle 20. In display unit 10 of the exemplary embodiment, when display controller 15 is controlled to adjust the display position of the image displayed on display device 12, user 30 can visually perceive proper virtual image 40. Therefore, the attachment error can be corrected in display unit 10 itself. Sometimes the position of the viewpoint of user 30 changes when the position of user 30 changes. In such cases, display controller 15 is controlled to adjust display positions 16A and 16B of image 16 displayed on display device 12, which allows user 30 to visually perceive proper virtual image 40.

In the display apparatus of the exemplary embodiment, desirably the viewpoint of user 30 is located in a substantial center of eye box 31 that is the visually recognizable region in order that user 30 can visually perceive proper virtual image 40. Accordingly, in the case that the position of the viewpoint of user 30 changes, display controller 15 controls the display positions 16A and 16B of image 16 displayed on display device 12 to be moved such that the viewpoint of user 30 is located in the substantial center of eye box 31 that is the visually recognizable region.

According to an experimental result, desirably Vi/Is is greater than or equal to 2 and less than 7. Where Vi is a movement amount of the user's viewpoint region and Is is a movement amount of image 16 displayed on display device 12. More desirably, display controller 15 controls the movement amount of image 16 such that Vi/Is is greater than or equal to 4 and less than 6. The experimental result showed that a distortion of the image observed in eye box 31 of user 30 increases when Vi/Is is greater than or equal to 7, and eye box 31 that is the visually recognizable region of user 30 is narrowed when Vi/Is is less than 2.

First mirror 13 that is the first reflecting member of the projection optical system is disposed above a display surface of display device 12, namely, immediately above display region 12A. In first mirror 13, reflection surface 13A that reflects the image displayed on display device 12 has a convex shape of a free-form surface. Second mirror 14 that is the second reflecting member of the projection optical system is disposed immediately below wind shield 22 that is the display member on the optical path on which the image is reflected by reflection surface 13A of first mirror 13. In second mirror 14, reflection surface 14A that faces reflection surface 13A of first mirror 13 and projects the image to wind shield 22 that is the display member has a concave shape of the free-form surface.

The arrangements of display device 12, first mirror 13, and second mirror 14 in display unit 10 will be described below.

Figure 7:
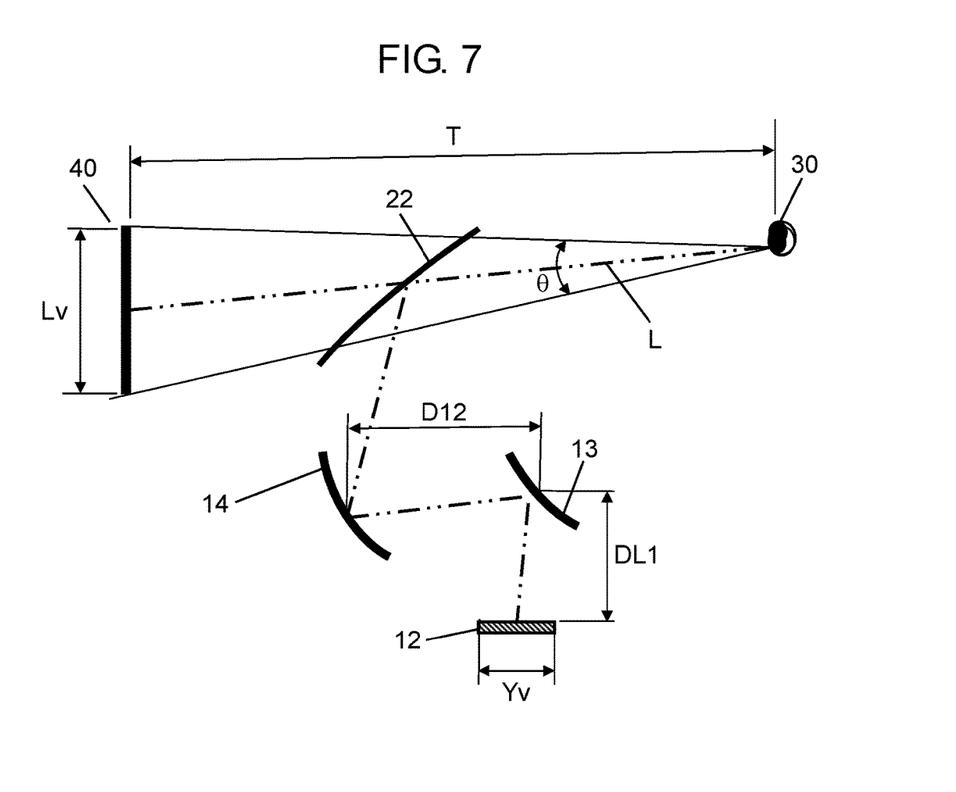
FIG. 7 is an explanatory view illustrating a positional relationship among the display device of the display unit, first and second mirrors, a user, and the virtual image.
Figure 8:
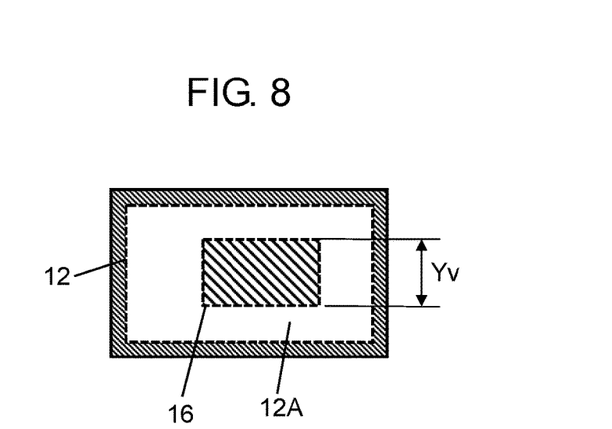
FIG. 8 is a plan view illustrating a positional relationship of the image displayed on the display device.

FIG. 7 is an explanatory view illustrating a positional relationship among the display device of the display unit, the first and second mirrors, the user, and the virtual image. FIG. 8 is a plan view illustrating a positional relationship of the image displayed on the display device. Each symbol illustrated in FIGS. 7 and 8 is defined as follows. An interval between display device 12 and first mirror 13 and an interval between first mirror 13 and second mirror 14 mean a length of the center optical path.

D12: Interval between first mirror 13 and second mirror 14 in center optical path Lv: Length (T×tan θ) in longitudinal direction of virtual image 40

T: Distance from pupil of user 30 to virtual image 40 in center optical path

θ: Angle in a vertical direction when virtual image 40 is viewed from pupil of user 30

Yv: Length (corresponding to length in perpendicular direction of virtual image) in longitudinal direction of image 16 displayed on display device 12

DL1: Interval between first mirror 13 and image 16 of display device 12

In the display apparatus provided with display unit 10 of the exemplary embodiment, first mirror 13 and second mirror 14 are disposed such that interval D12 between first mirror 13 and second mirror 14 satisfies 0.2<D12/Lv<1.3. Desirably, first mirror 13 and second mirror 14 are disposed such that interval D12 between first mirror 13 and second mirror 14 satisfies 0.5<D12/Lv<1.0. More desirably, first mirror 13 and second mirror 14 are disposed such that an upper limit of interval D12 between first mirror 13 and second mirror 14 satisfies D12/Lv<0.9.

Therefore, user 30 can visually perceive sufficiently large virtual image 40 in small-size display unit 10 having the small interval between first mirror 13 and second mirror 14. An increase in curvature of second mirror 14 can be restrained, and a screen distortion of virtual image 40 can easily be corrected. That is, in the exemplary embodiment, downsizing of display unit 10 can be provided.

In the display apparatus of the exemplary embodiment, a relationship between length Yv in the longitudinal direction of image 16 displayed on display device 12 and distance T in the center optical path from user 30 to virtual image 40 satisfies $0.03 < \sqrt{(T \times Lv)}/Yv < 0.22$.

In the exemplary embodiment, when the relationship of $\sqrt{(T \times Lv)}/Yv$ between length Yv in the longitudinal direction of image 16 and distance T from user 30 to virtual image 40 is larger than 0.22, the distance from user 30 to virtual image 40 increases to enlarge the display apparatus. On the other hand, when the relationship of $\sqrt{(T \times Lv)}/Yv$ between length Yv in the longitudinal direction of image 16 and distance T from user 30 to virtual image 40 is smaller than 0.03, it is necessary to increase the length in the longitudinal direction of image 16 displayed on display device 12, which results in the enlarged display unit 10. That is, in the exemplary embodiment, the downsizing of display unit 10 can be provided, and the downsizing of the display apparatus provided with display unit 10 can be provided.

In the display apparatus provided with display unit 10 of the exemplary embodiment, interval D12 between first mirror 13 and second mirror 14 and interval DL1 between first mirror 13 and image 16 of display device 12 satisfy 3.0<D12/DL1. Desirably interval D12 between first mirror 13 and second mirror 14 and interval DL1 between first mirror 13 and image 16 of display device 12 satisfy 3.5<D12/DL1<10.0. More desirably interval D12 between first mirror 13 and second mirror 14 and interval DL1 between first mirror 13 and image 16 of display device 12 satisfy 5.0<D12/DL1<8.0.

In the exemplary embodiment, when interval D12 between first mirror 13 and second mirror 14 and interval DL1 between first mirror 13 and image 16 of display device 12 satisfy 3.0<D12/DL1, the increase in curvature of second mirror 14 can be restrained, and the screen distortion of virtual image 40 can easily be corrected. That is, in the exemplary embodiment, downsizing of display unit 10 can be provided.

Figure 9:
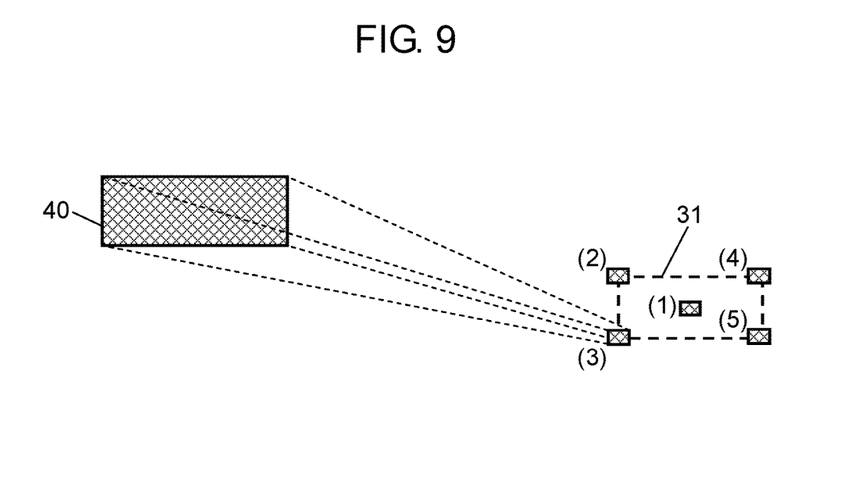
FIG. 9 is an explanatory view illustrating a relationship between an eye box that is a user's visually recognizable region and a user's recognizable virtual image in the exemplary embodiment.
Figure 10:
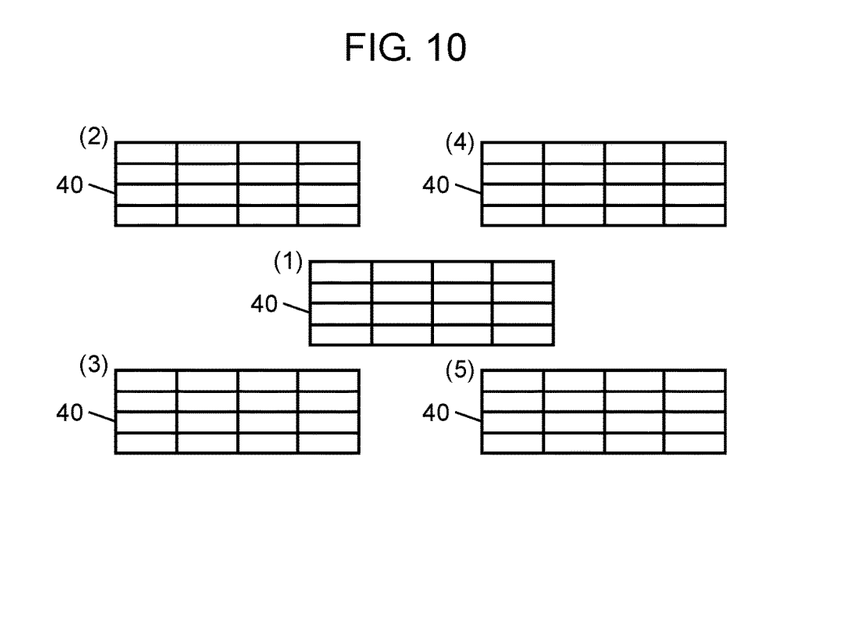
FIG. 10 is an explanatory view illustrating a state when the virtual image is viewed from each of positions (1) to (5) of the eye box that is the visually recognizable region in the exemplary embodiment.

FIG. 9 is an explanatory view illustrating a relationship between the eye box that is the user's visually recognizable region and the user's recognizable virtual image in the exemplary embodiment. In FIG. 9, virtual image 40 is viewed from lower left position (3) of eye box 31. FIG. 10 is an explanatory view illustrating a state when the virtual image is viewed from each of positions (1) to (5) of the eye box that is the visually recognizable region in the exemplary embodiment. As used herein, the visually recognizable region (eye box) means a region where the user can observe the whole virtual image without omission. In the exemplary embodiment, the visually recognizable region has a rectangular shape of 120 mm×35 mm.

As illustrated in FIG. 10, in the display apparatus of the exemplary embodiment, the screen distortion is corrected in the whole region of eye box 31 when virtual image 40 is viewed from positions (1) to (5) of eye box 31. That is, user 30 can visually perceive good virtual image 40 in the whole region of eye box 31.

Figure 11:
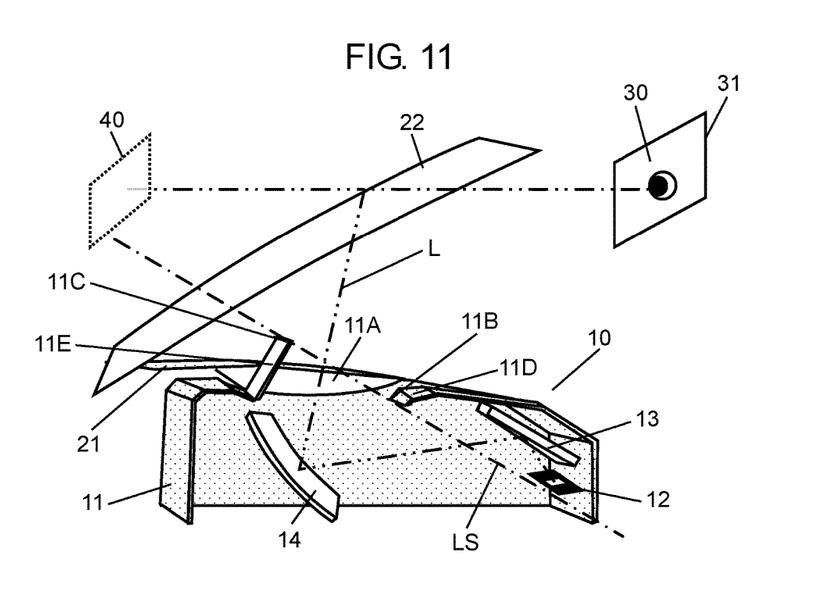
FIG. 11 is a perspective view illustrating a configuration of a display unit according to another exemplary embodiment used in the on-vehicle display apparatus.

FIG. 11 is a perspective view illustrating a configuration of a display unit according to another exemplary embodiment used in the on-vehicle display apparatus. In housing 11 of display unit 10 of another exemplary embodiment, as illustrated in FIG. 11, first light shielding section 11D is provided at a rim on the side of first mirror 13 of opening 11A through which the projected light passes, and second light shielding section 11E having a shape raised from housing 11 is provided at a rim on the side of second mirror 14 of opening 11A. First light shielding section 11D includes first end 11B, and second light shielding section 11E includes second end 11C. Display device 12 is disposed such that the display region where the image is displayed is located on the side of first mirror 13 with respect to straight line LS connecting first end 11B and second end 11C.

Therefore, even if the light is incident on display unit 10, the incidence of the light on the display region of display device 12 can be restrained to form high-quality virtual image 40. Additionally, in another exemplary embodiment, display unit 10 includes first light shielding section 11D and second light shielding section 11E to enlarge an opening area of opening 11A, so that a degree of freedom can be ensured in design.

As described above, in the present technology, display unit 10 that projects the image is configured to accommodate display device 12 that displays the image and the projection optical system that projects the image displayed on display device 12 to the display member in housing 11 including opening 11A through which projected light is output. The projection optical system includes first mirror 13 disposed on the side of display device 12 and second mirror 14 disposed on the side of opening 11A in the optical path from display device 12 to opening 11A. Reflection surface 13A of first mirror 13 that reflects the image displayed on display device 12 has the convex shape of the free-form surface, and reflection surface 14A of second mirror 14 that projects the image to the display member has the concave shape of the free-form surface.

In the present technology, the screen distortion generated in wind shield 22 that is the display member having the predetermined curvature can be corrected well. Therefore, the screen distortion is decreased in the virtual image of the image formed on the opposite side to the user side of the display member, and the user can visually perceive the virtual image without sensing an uncomfortable feeling.

In display unit 10 of the present technology, desirably reflection surface 13A of first mirror 13 has a rotationally asymmetric convex shape. Therefore, the screen distortion can be corrected well over the whole user's viewpoint region. Desirably reflection surface 13A of first mirror 13 has the convex shape in the horizontal direction. Therefore, the curvature in the horizontal direction of reflection surface 14A of second mirror 14 can be increased and the display apparatus can be downsized.

Figure 12:
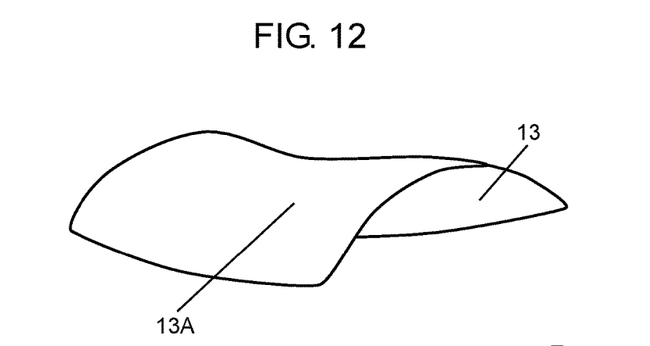
FIG. 12 is a perspective view illustrating another example of the first mirror.

Rotationally asymmetric reflection surface 13A of first mirror 13 may have a shape in which the X-axis direction differs from the Y-axis direction in the curvature as illustrated in FIG. 12.

Figure 13:
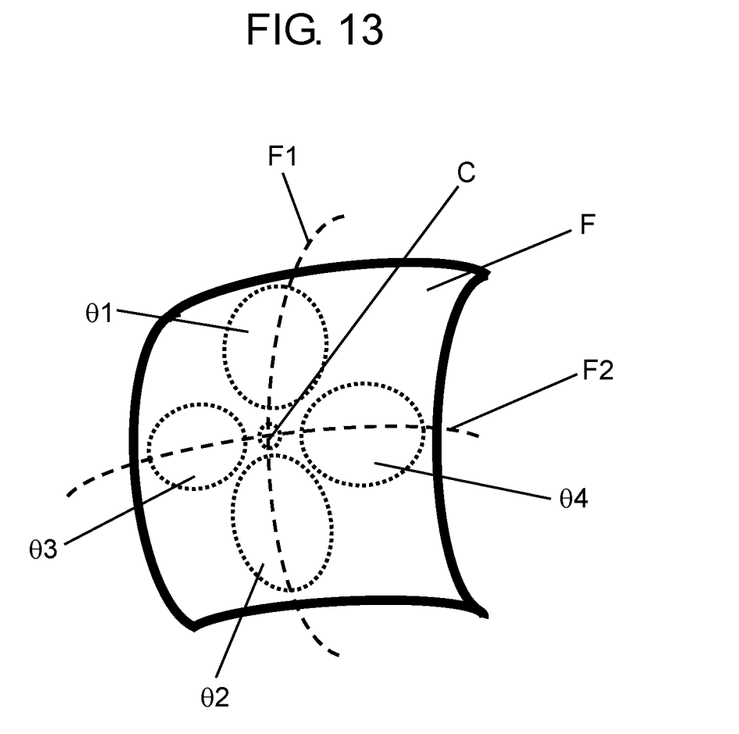
FIG. 13 is an explanatory view illustrating an example of a mirror in which a reflection surface is a free-form surface.

FIG. 13 is an explanatory view illustrating an example of the mirror in which the reflection surface is the free-form surface. As illustrated in FIG. 13, the reflection surface which is the free-form surface is defined as follows.

Assuming that reference longitudinal curve F1 and reference crosswise curve F2 pass through optical axis C of the center optical path of the image, reflection surface F has reflecting regions θ1, θ2, θ3, and θ4 having different curvatures with a point at which reference longitudinal curve F1 intersects reference crosswise curve F2 as a boundary.

EXAMPLES

Specific examples of the display apparatus of the present technology will be described below. In Examples described below, the length in Tables has a unit (mm), and the angle has a unit (degree). The free-form surface is defined by the following mathematical formula.

$$z = \frac{cr^2}{1+\sqrt{1-(1+k)c^2r^2}} + \sum_{j=2} c_j x^m y^n$$

$$j = \frac{(m+n)^2 + m + 3n}{2} + 1$$

[Mathematical formula 1]

Where z is a sag amount at a position (x,y) from an axis defining the surface, r is a curvature radius at an origin of the axis defining the surface, c is a curvature at the origin of the axis defining the surface, k is a conic constant, and Cj is a coefficient of a monomial $x^m y^n$.

In each Example, a coordinate origin that is a reference is located in the center of the image (display surface) displayed on display device 12. In Tables, the crosswise direction of the display surface is set to an X-axis, the longitudinal direction is set to a Y-axis, and a direction perpendicular to the display surface is set to a Z-axis.

In Tables, a surface number 1 indicates the display surface of display device 12, a surface number 2 indicates first mirror 13, a surface number 3 indicates the second mirror, a surface number 4 indicates wind shield 22, and a surface number 5 indicates the user's viewpoint. In eccentric data, ADE means a rotation amount of the mirror from the Z-axis direction toward the Y-axis direction about the X-axis, BDE means a rotation amount of the mirror from the X-axis direction toward the Z-axis direction about the Y-axis, and CDE means a rotation amount of the mirror from the X-axis direction toward the Y-axis direction about the Z-axis.

Example 1

TABLE 1

| Surface number | X-curvature | Y-curvature |
|---|---|---|
| 2 | 603.2021 | 2654.4 |

TABLE 2

| Surface number | Polynomial coefficient | | | | | | | |
|---|---|---|---|---|---|---|---|---|
| 3 | C1 | 0.00000E+00 | C19 | 4.87235E−12 | C37 | 0.00000E+00 | C55 | 0.00000E+00 |
| | C2 | −3.53809E−02 | C20 | −1.22754E−10 | C38 | 0.00000E+00 | C56 | 0.00000E+00 |
| | C3 | 1.28813E−02 | C21 | 3.76537E−10 | C39 | 0.00000E+00 | C57 | 0.00000E+00 |
| | C4 | 6.92444E−04 | C22 | −2.41843E−14 | C40 | 0.00000E+00 | C58 | 0.00000E+00 |
| | C5 | 5.21278E−06 | C23 | 5.70609E−14 | C41 | 0.00000E+00 | C59 | 0.00000E+00 |
| | C6 | 2.72060E−04 | C24 | −1.55312E−13 | C42 | 0.00000E+00 | C60 | 0.00000E+00 |
| | C7 | −3.35289E−07 | C25 | 5.63778E−13 | C43 | 0.00000E+00 | C61 | 0.00000E+00 |
| | C8 | −2.38015E−07 | C26 | −1.72194E−12 | C44 | 0.00000E+00 | C62 | 0.00000E+00 |
| | C9 | −1.86100E−07 | C27 | 3.64513E−12 | C45 | 0.00000E+00 | C63 | 0.00000E+00 |
| | C10 | −1.06353E−06 | C28 | −6.10356E−12 | C46 | 0.00000E+00 | C64 | 0.00000E+00 |
| | C11 | 2.39274E−09 | C29 | 0.00000E+00 | C47 | 0.00000E+00 | C65 | 0.00000E+00 |
| | C12 | −1.23325E−10 | C30 | 0.00000E+00 | C48 | 0.00000E+00 | C66 | 0.00000E+00 |
| | C13 | 5.27888E−09 | C31 | 0.00000E+00 | C49 | 0.00000E+00 | | |
| | C14 | −7.12437E−09 | C32 | 0.00000E+00 | C50 | 0.00000E+00 | | |
| | C15 | 1.34163E−08 | C33 | 0.00000E+00 | C51 | 0.00000E+00 | | |
| | C16 | 9.51762E−13 | C34 | 0.00000E+00 | C52 | 0.00000E+00 | | |
| | C17 | −1.48362E−11 | C35 | 0.00000E+00 | C53 | 0.00000E+00 | | |
| | C18 | 9.29390E−12 | C36 | 0.00000E+00 | C54 | 0.00000E+00 | | |

TABLE 3

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Toroidal | −1.836 | 2.033 | 48.083 | −30.835 | 2.234 | 0.577 |
| 3 | Free-form surface | 1.602 | 116.142 | −7.383 | −41.903 | 2.082 | 0.995 |
| 4 | Toroidal | 12.044 | 5.809 | 256.018 | 43.684 | 5.817 | 2.521 |
| 5 | | 203.349 | −755.414 | 511.993 | 109.093 | 6.642 | −8.320 |

Example 2

TABLE 4

| Surface number | | | Polynomial coefficient | | | | | |
|---|---|---|---|---|---|---|---|---|
| 2 | C1 | 0.00000E+00 | C19 | 2.41168E−11 | C37 | 0.00000E+00 | C55 | 0.00000E+00 |
| | C2 | −2.37943E−02 | C20 | −1.90336E−10 | C38 | 0.00000E+00 | C56 | 0.00000E+00 |
| | C3 | 1.69540E−02 | C21 | 2.95788E−10 | C39 | 0.00000E+00 | C57 | 0.00000E+00 |
| | C4 | 6.95718E−04 | C22 | −1.14425E−14 | C40 | 0.00000E+00 | C58 | 0.00000E+00 |
| | C5 | 2.53616E−05 | C23 | 9.02420E−14 | C41 | 0.00000E+00 | C59 | 0.00000E+00 |
| | C6 | 2.93214E−04 | C24 | −1.18772E−13 | C42 | 0.00000E+00 | C60 | 0.00000E+00 |
| | C7 | −4.97930E−07 | C25 | 2.31335E−13 | C43 | 0.00000E+00 | C61 | 0.00000E+00 |
| | C8 | −6.24744E−07 | C26 | −9.13190E−13 | C44 | 0.00000E+00 | C62 | 0.00000E+00 |
| | C9 | −6.72213E−07 | C27 | 3.19186E−12 | C45 | 0.00000E+00 | C63 | 0.00000E+00 |
| | C10 | −4.12374E−07 | C28 | −4.36103E−12 | C46 | 0.00000E+00 | C64 | 0.00000E+00 |
| | C11 | 1.40407E−09 | C29 | 0.00000E+00 | C47 | 0.00000E+00 | C65 | 0.00000E+00 |
| | C12 | −3.73506E−10 | C30 | 0.00000E+00 | C48 | 0.00000E+00 | C66 | 0.00000E+00 |
| | C13 | 4.88892E−09 | C31 | 0.00000E+00 | C49 | 0.00000E+00 | | |
| | C14 | −3.10558E−09 | C32 | 0.00000E+00 | C50 | 0.00000E+00 | | |
| | C15 | 8.54164E−09 | C33 | 0.00000E+00 | C51 | 0.00000E+00 | | |
| | C16 | −8.95059E−13 | C34 | 0.00000E+00 | C52 | 0.00000E+00 | | |
| | C17 | −1.47160E−11 | C35 | 0.00000E+00 | C53 | 0.00000E+00 | | |
| | C18 | −1.83957E−12 | C36 | 0.00000E+00 | C54 | 0.00000E+00 | | |
| 3 | C1 | 0.00000E+00 | C19 | −1.44244E−10 | C37 | 0.00000E+00 | C55 | 0.00000E+00 |
| | C2 | 5.55069E−02 | C20 | −1.13270E−09 | C38 | 0.00000E+00 | C56 | 0.00000E+00 |
| | C3 | 2.88012E−02 | C21 | 5.86354E−10 | C39 | 0.00000E+00 | C57 | 0.00000E+00 |
| | C4 | 1.79659E−04 | C22 | −7.19280E−13 | C40 | 0.00000E+00 | C58 | 0.00000E+00 |
| | C5 | −2.29361E−05 | C23 | 7.83822E−12 | C41 | 0.00000E+00 | C59 | 0.00000E+00 |
| | C6 | −4.44075E−04 | C24 | 5.78822E−14 | C42 | 0.00000E+00 | C60 | 0.00000E+00 |
| | C7 | −2.94434E−06 | C25 | 3.58110E−12 | C43 | 0.00000E+00 | C61 | 0.00000E+00 |
| | C8 | −4.46411E−06 | C26 | −9.17880E−12 | C44 | 0.00000E+00 | C62 | 0.00000E+00 |
| | C9 | −2.97119E−06 | C27 | 1.87450E−11 | C45 | 0.00000E+00 | C63 | 0.00000E+00 |
| | C10 | 3.34442E−06 | C28 | −7.35955E−11 | C46 | 0.00000E+00 | C64 | 0.00000E+00 |
| | C11 | −1.18069E−08 | C29 | 9.28492E−15 | C47 | 0.00000E+00 | C65 | 0.00000E+00 |
| | C12 | −2.24904E−08 | C30 | −1.66169E−14 | C48 | 0.00000E+00 | C66 | 0.00000E+00 |
| | C13 | 3.83585E−08 | C31 | −3.33447E−14 | C49 | 0.00000E+00 | | |
| | C14 | −5.06094E−09 | C32 | −6.11151E−14 | C50 | 0.00000E+00 | | |
| | C15 | 1.15003E−07 | C33 | −7.48046E−14 | C51 | 0.00000E+00 | | |
| | C16 | −4.48742E−11 | C34 | 1.58819E−13 | C52 | 0.00000E+00 | | |
| | C17 | 6.52135E−11 | C35 | 6.56811E−13 | C53 | 0.00000E+00 | | |
| | C18 | −2.66825E−10 | C36 | 1.08622E−14 | C54 | 0.00000E+00 | | |

TABLE 5

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Free-form surface | −0.377 | 6.917 | 47.660 | −27.080 | 0.566 | −0.024 |
| 3 | Free-form surface | 0.676 | 119.411 | −11.103 | −40.435 | 0.556 | 0.108 |
| 4 | Toroidal | 21.177 | 17.593 | 255.181 | 45.060 | 6.490 | 4.825 |
| 5 | | 245.397 | −728.488 | 528.440 | 110.670 | 9.006 | −7.980 |

Example 3

TABLE 6

| Surface number | X-curvature | Y-curvature |
|---|---|---|
| 2 | 711.0349 | 628.2919 |

TABLE 7

| Surface number | | | Polynomial coefficient | | | | | |
|---|---|---|---|---|---|---|---|---|
| 3 | C1 | −7.74625E+00 | C19 | 2.49212E−11 | C37 | 9.30119E−19 | C55 | 5.72526E−18 |
| | C2 | −1.73760E−02 | C20 | 5.59040E−11 | C38 | 1.67547E−18 | C56 | −1.43014E−22 |
| | C3 | −3.54173E−02 | C21 | 2.13743E−11 | C39 | 2.20897E−19 | C57 | −1.67215E−23 |

TABLE 7-continued

| Surface number | | Polynomial coefficient | | | | | | |
|---|---|---|---|---|---|---|---|---|
| | C4 | 5.57437E−04 | C22 | −1.14501E−15 | C40 | −2.43948E−17 | C58 | −4.39331E−22 |
| | C5 | 4.91213E−05 | C23 | −2.39542E−14 | C41 | −2.78455E−18 | C59 | 5.33256E−22 |
| | C6 | 2.72918E−04 | C24 | 5.34863E−14 | C42 | −9.89926E−18 | C60 | 8.68017E−22 |
| | C7 | 6.70001E−08 | C25 | 5.49852E−13 | C43 | 2.10560E−17 | C61 | −1.46669E−21 |
| | C8 | −3.68481E−07 | C26 | −3.26715E−13 | C44 | 4.10178E−16 | C62 | 4.57527E−21 |
| | C9 | −7.18698E−08 | C27 | −9.84776E−13 | C45 | 3.85909E−16 | C63 | −3.00340E−21 |
| | C10 | −1.97712E−07 | C28 | −9.93883E−13 | C46 | 1.40656E−20 | C64 | −2.54986E−20 |
| | C11 | 1.61710E−09 | C29 | 6.07330E−16 | C47 | −1.45731E−22 | C65 | 1.92867E−21 |
| | C12 | 4.96069E−11 | C30 | −1.17494E−16 | C48 | 8.90634E−20 | C66 | −8.45424E−20 |
| | C13 | 3.19279E−09 | C31 | −8.05043E−16 | C49 | 9.38960E−20 | | |
| | C14 | −2.68371E−09 | C32 | −2.62095E−15 | C50 | −2.95915E−19 | | |
| | C15 | 5.40272E−09 | C33 | 1.69253E−15 | C51 | −4.41647E−20 | | |
| | C16 | −1.87291E−11 | C34 | −7.25278E−15 | C52 | 6.92333E−19 | | |
| | C17 | −1.72096E−12 | C35 | −1.56103E−14 | C53 | 1.81955E−18 | | |
| | C18 | −5.14945E−12 | C36 | −2.44877E−14 | C54 | −1.17293E−18 | | |

TABLE 8

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Toroidal | 2.933 | 1.054 | 45.949 | −39.465 | −1.082 | −4.335 |
| 3 | Free-form surface | 8.680 | 162.225 | 18.038 | −58.032 | 0.358 | −4.453 |
| 4 | Toroidal | 59.478 | 20.245 | 245.022 | 31.889 | 2.347 | 1.388 |
| 5 | | 168.515 | −800.395 | 336.634 | 96.038 | 4.685 | −6.441 |

Example 4

TABLE 9

| Surface number | | | Polynomial coefficient | | | | | |
|---|---|---|---|---|---|---|---|---|
| 2 | C1 | 0.00000E+00 | C19 | −1.28160E−10 | C37 | 0.00000E+00 | C55 | 0.00000E+00 |
| | C2 | −1.88798E−03 | C20 | −4.88795E−10 | C38 | 0.00000E+00 | C56 | 0.00000E+00 |
| | C3 | −1.16384E−02 | C21 | 4.65021E−11 | C39 | 0.00000E+00 | C57 | 0.00000E+00 |
| | C4 | −2.20104E−05 | C22 | 1.79401E−12 | C40 | 0.00000E+00 | C58 | 0.00000E+00 |
| | C5 | −5.60173E−05 | C23 | 9.52643E−13 | C41 | 0.00000E+00 | C59 | 0.00000E+00 |
| | C6 | −8.71798E−05 | C24 | 1.70778E−12 | C42 | 0.00000E+00 | C60 | 0.00000E+00 |
| | C7 | −1.37429E−06 | C25 | 9.42122E−13 | C43 | 0.00000E+00 | C61 | 0.00000E+00 |
| | C8 | −2.39788E−06 | C26 | 2.23806E−12 | C44 | 0.00000E+00 | C62 | 0.00000E+00 |
| | C9 | −4.09949E−06 | C27 | −1.08763E−12 | C45 | 0.00000E+00 | C63 | 0.00000E+00 |
| | C10 | 1.08131E−06 | C28 | 4.61590E−12 | C46 | 0.00000E+00 | C64 | 0.00000E+00 |
| | C11 | −8.45057E−09 | C29 | 0.00000E+00 | C47 | 0.00000E+00 | C65 | 0.00000E+00 |
| | C12 | 4.32821E−09 | C30 | 0.00000E+00 | C48 | 0.00000E+00 | C66 | 0.00000E+00 |
| | C13 | 2.24025E−08 | C31 | 0.00000E+00 | C49 | 0.00000E+00 | | |
| | C14 | 1.51402E−08 | C32 | 0.00000E+00 | C50 | 0.00000E+00 | | |
| | C15 | −5.48935E−09 | C33 | 0.00000E+00 | C51 | 0.00000E+00 | | |
| | C16 | −6.11656E−11 | C34 | 0.00000E+00 | C52 | 0.00000E+00 | | |
| | C17 | −2.97250E−10 | C35 | 0.00000E+00 | C53 | 0.00000E+00 | | |
| | C18 | −1.38852E−10 | C36 | 0.00000E+00 | C54 | 0.00000E+00 | | |
| 3 | C1 | −4.13454E+00 | C19 | 2.13613E−11 | C37 | 5.30403E−19 | C55 | 5.51614E−18 |
| | C2 | −1.25103E−02 | C20 | 4.26555E−11 | C38 | 1.84207E−18 | C56 | −1.19051E−22 |
| | C3 | −3.33999E−02 | C21 | 3.42848E−11 | C39 | −9.20942E−19 | C57 | −7.26209E−24 |
| | C4 | 5.57897E−04 | C22 | −2.89755E−14 | C40 | −2.48408E−17 | C58 | −4.55573E−22 |
| | C5 | 4.81348E−05 | C23 | −2.72475E−14 | C41 | 3.64698E−18 | C59 | 3.97866E−22 |
| | C6 | 2.73964E−04 | C24 | 3.73200E−14 | C42 | −6.26492E−18 | C60 | 7.64242E−22 |
| | C7 | −9.02684E−08 | C25 | 4.71097E−13 | C43 | 1.51546E−17 | C61 | −1.46295E−21 |
| | C8 | −5.62752E−07 | C26 | −2.32457E−13 | C44 | 3.47700E−16 | C62 | 3.58028E−21 |
| | C9 | −4.16046E−07 | C27 | −1.07144E−12 | C45 | 3.67879E−16 | C63 | −4.69101E−21 |
| | C10 | −1.75022E−07 | C28 | −7.46368E−13 | C46 | 1.68651E−20 | C64 | −2.21322E−20 |
| | C11 | 1.75704E−09 | C29 | 5.65531E−16 | C47 | 9.24582E−22 | C65 | 8.72864E−21 |
| | C12 | 3.90988E−10 | C30 | −2.56218E−16 | C48 | 1.00871E−19 | C66 | −7.82403E−20 |
| | C13 | 2.80206E−09 | C31 | −6.36585E−16 | C49 | 8.61703E−20 | | |
| | C14 | −1.45904E−09 | C32 | −1.97885E−15 | C50 | −2.61479E−19 | | |
| | C15 | 4.27866E−09 | C33 | 1.74136E−15 | C51 | 6.79566E−20 | | |
| | C16 | −1.86021E−11 | C34 | −7.29656E−15 | C52 | 6.59543E−19 | | |
| | C17 | −6.34215E−13 | C35 | −1.68610E−14 | C53 | 1.68901E−18 | | |
| | C18 | −1.08581E−11 | C36 | −2.53896E−14 | C54 | −9.15230E−19 | | |

TABLE 10

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Free-form surface | −3.139 | 4.384 | 51.009 | −33.675 | 5.137 | −0.818 |
| 3 | Free-form surface | 9.725 | 159.210 | 1.656 | −50.376 | 5.155 | 0.690 |
| 4 | Toroidal | 37.961 | 47.706 | 253.040 | 39.594 | 7.745 | −3.307 |
| 5 | | 119.229 | −754.992 | 459.930 | 103.782 | 2.822 | −13.350 |

Example 5

TABLE 11

| Surface number | | | Polynomial coefficient | | | | | | |
|---|---|---|---|---|---|---|---|---|---|
| 2 | C1 | 0.00000E+00 | C19 | 8.54316E−10 | C37 | 0.00000E+00 | C55 | 0.00000E+00 |
| | C2 | 7.43401E−02 | C20 | −3.00716E−08 | C38 | 0.00000E+00 | C56 | 0.00000E+00 |
| | C3 | 1.26031E−01 | C21 | 8.57783E−08 | C39 | 0.00000E+00 | C57 | 0.00000E+00 |
| | C4 | 6.47921E−04 | C22 | −2.48786E−11 | C40 | 0.00000E+00 | C58 | 0.00000E+00 |
| | C5 | 4.33203E−05 | C23 | 6.08772E−11 | C41 | 0.00000E+00 | C59 | 0.00000E+00 |
| | C6 | −9.13686E−06 | C24 | −7.51368E−11 | C42 | 0.00000E+00 | C60 | 0.00000E+00 |
| | C7 | 2.70405E−06 | C25 | 2.77485E−11 | C43 | 0.00000E+00 | C61 | 0.00000E+00 |
| | C8 | −2.15690E−05 | C26 | −5.82084E−11 | C44 | 0.00000E+00 | C62 | 0.00000E+00 |
| | C9 | −1.00719E−05 | C27 | −3.76834E−10 | C45 | 0.00000E+00 | C63 | 0.00000E+00 |
| | C10 | 3.62560E−05 | C28 | 8.58741E−10 | C46 | 0.00000E+00 | C64 | 0.00000E+00 |
| | C11 | −1.28051E−07 | C29 | 0.00000E+00 | C47 | 0.00000E+00 | C65 | 0.00000E+00 |
| | C12 | −7.41791E−08 | C30 | 0.00000E+00 | C48 | 0.00000E+00 | C66 | 0.00000E+00 |
| | C13 | 1.95578E−07 | C31 | 0.00000E+00 | C49 | 0.00000E+00 | | |
| | C14 | −8.83249E−07 | C32 | 0.00000E+00 | C50 | 0.00000E+00 | | |
| | C15 | 3.04264E−06 | C33 | 0.00000E+00 | C51 | 0.00000E+00 | | |
| | C16 | −1.63944E−09 | C34 | 0.00000E+00 | C52 | 0.00000E+00 | | |
| | C17 | 5.02021E−09 | C35 | 0.00000E+00 | C53 | 0.00000E+00 | | |
| | C18 | 3.61341E−09 | C36 | 0.00000E+00 | C54 | 0.00000E+00 | | |
| 3 | C1 | 0.00000E+00 | C19 | 1.05313E−10 | C37 | 0.00000E+00 | C55 | 0.00000E+00 |
| | C2 | 7.52284E−02 | C20 | −4.81729E−11 | C38 | 0.00000E+00 | C56 | 0.00000E+00 |
| | C3 | −3.30535E−02 | C21 | 2.49310E−10 | C39 | 0.00000E+00 | C57 | 0.00000E+00 |
| | C4 | 8.44337E−04 | C22 | −1.70460E−13 | C40 | 0.00000E+00 | C58 | 0.00000E+00 |
| | C5 | 6.09928E−05 | C23 | −8.10118E−14 | C41 | 0.00000E+00 | C59 | 0.00000E+00 |
| | C6 | 4.14469E−04 | C24 | −2.61025E−13 | C42 | 0.00000E+00 | C60 | 0.00000E+00 |
| | C7 | 7.24104E−07 | C25 | −2.44547E−13 | C43 | 0.00000E+00 | C61 | 0.00000E+00 |
| | C8 | −1.80204E−06 | C26 | 8.29562E−13 | C44 | 0.00000E+00 | C62 | 0.00000E+00 |
| | C9 | 3.80002E−07 | C27 | −2.79408E−13 | C45 | 0.00000E+00 | C63 | 0.00000E+00 |
| | C10 | −6.31093E−07 | C28 | 9.61641E−13 | C46 | 0.00000E+00 | C64 | 0.00000E+00 |
| | C11 | 1.57841E−09 | C29 | 0.00000E+00 | C47 | 0.00000E+00 | C65 | 0.00000E+00 |
| | C12 | −3.45145E−09 | C30 | 0.00000E+00 | C48 | 0.00000E+00 | C66 | 0.00000E+00 |
| | C13 | 7.12120E−09 | C31 | 0.00000E+00 | C49 | 0.00000E+00 | | |
| | C14 | −4.93262E−09 | C32 | 0.00000E+00 | C50 | 0.00000E+00 | | |
| | C15 | 2.35792E−08 | C33 | 0.00000E+00 | C51 | 0.00000E+00 | | |
| | C16 | −1.54142E−11 | C34 | 0.00000E+00 | C52 | 0.00000E+00 | | |
| | C17 | −3.73411E−11 | C35 | 0.00000E+00 | C53 | 0.00000E+00 | | |
| | C18 | −3.24326E−11 | C36 | 0.00000E+00 | C54 | 0.00000E+00 | | |

TABLE 12

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Free-form surface | 3.163 | 19.185 | 38.804 | −30.903 | −2.266 | −3.512 |
| 3 | Free-form surface | 6.488 | 129.959 | 34.777 | −62.496 | −0.087 | −4.178 |
| 4 | Toroidal | 1.181 | 32.392 | 161.303 | 26.936 | −5.181 | −5.854 |
| 5 | | −168.219 | −775.581 | 126.260 | 85.317 | −12.157 | 8.390 |

Example 6

TABLE 13

| Surface number | | | | Polynomial coefficient | | | | |
|---|---|---|---|---|---|---|---|---|
| 2 | C1 | 5.31393E+00 | C19 | 4.18832E−08 | C37 | −6.59034E−15 | C55 | 0.00000E+00 |
| | C2 | 6.14628E−02 | C20 | −1.57336E−07 | C38 | −3.14026E−14 | C56 | 0.00000E+00 |
| | C3 | 4.64893E−01 | C21 | 2.09544E−07 | C39 | −1.17757E−14 | C57 | 0.00000E+00 |
| | C4 | 1.79720E−03 | C22 | −4.57278E−10 | C40 | −1.12045E−13 | C58 | 0.00000E+00 |
| | C5 | 1.12476E−04 | C23 | −9.57855E−10 | C41 | −3.18139E−13 | C59 | 0.00000E+00 |
| | C6 | −4.01159E−04 | C24 | 2.75575E−10 | C42 | 1.10232E−13 | C60 | 0.00000E+00 |
| | C7 | 3.25630E−05 | C25 | 1.64775E−09 | C43 | 4.23078E−13 | C61 | 0.00000E+00 |
| | C8 | 4.60919E−06 | C26 | 6.44462E−11 | C44 | 1.00736E−12 | C62 | 0.00000E+00 |
| | C9 | −6.03291E−05 | C27 | −4.46906E−10 | C45 | −9.14181E−13 | C63 | 0.00000E+00 |
| | C10 | −3.58176E−05 | C28 | 2.14478E−09 | C46 | 0.00000E+00 | C64 | 0.00000E+00 |
| | C11 | −3.92909E−07 | C29 | −3.42160E−12 | C47 | 0.00000E+00 | C65 | 0.00000E+00 |
| | C12 | 7.98664E−07 | C30 | −1.09891E−11 | C48 | 0.00000E+00 | C66 | 0.00000E+00 |
| | C13 | 1.72870E−06 | C31 | −4.89577E−12 | C49 | 0.00000E+00 | | |
| | C14 | −5.87419E−06 | C32 | −3.37324E−12 | C50 | 0.00000E+00 | | |
| | C15 | 3.61494E−06 | C33 | 1.53945E−12 | C51 | 0.00000E+00 | | |
| | C16 | −2.52222E−08 | C34 | 1.01476E−11 | C52 | 0.00000E+00 | | |
| | C17 | −1.72663E−08 | C35 | 6.54663E−11 | C53 | 0.00000E+00 | | |
| | C18 | 7.33649E−08 | C36 | −5.37173E−11 | C54 | 0.00000E+00 | | |
| 3 | C1 | 0.00000E+00 | C19 | 1.17932E−10 | C37 | 8.18620E−18 | C55 | 0.00000E+00 |
| | C2 | 2.08429E−02 | C20 | 2.38981E−10 | C38 | −6.90889E−18 | C56 | 0.00000E+00 |
| | C3 | 1.26733E−01 | C21 | 1.05279E−09 | C39 | 4.21005E−18 | C57 | 0.00000E+00 |
| | C4 | 1.60031E−03 | C22 | 8.16294E−14 | C40 | −4.25062E−17 | C58 | 0.00000E+00 |
| | C5 | −7.79659E−05 | C23 | −4.87975E−13 | C41 | 1.97423E−16 | C59 | 0.00000E+00 |
| | C6 | 1.12460E−03 | C24 | −7.68740E−13 | C42 | 2.62493E−17 | C60 | 0.00000E+00 |
| | C7 | 9.69798E−07 | C25 | 3.10216E−13 | C43 | 7.93750E−16 | C61 | 0.00000E+00 |
| | C8 | −9.17625E−07 | C26 | −1.27347E−12 | C44 | 1.57455E−16 | C62 | 0.00000E+00 |
| | C9 | 1.62679E−06 | C27 | −3.78998E−12 | C45 | 1.15341E−15 | C63 | 0.00000E+00 |
| | C10 | 3.34641E−07 | C28 | −8.27369E−12 | C46 | 0.00000E+40 | C64 | 0.00000E+00 |
| | C11 | 1.67478E−09 | C29 | 2.09554E−15 | C47 | 0.00000E+00 | C65 | 0.00000E+00 |
| | C12 | 1.62408E−09 | C30 | −2.43596E−15 | C48 | 0.00000E+00 | C66 | 0.00000E+00 |
| | C13 | −1.95545E−09 | C31 | 2.48185E−15 | C49 | 0.00000E+00 | | |
| | C14 | −1.00740E−08 | C32 | −1.04840E−14 | C50 | 0.00000E+00 | | |
| | C15 | −3.43339E−08 | C33 | 1.81644E−14 | C51 | 0.00000E+00 | | |
| | C16 | −8.78711E−12 | C34 | −4.60001E−14 | C52 | 0.00000E+00 | | |
| | C17 | −2.95545E−11 | C35 | 6.00041E−15 | C53 | 0.00000E+00 | | |
| | C18 | −1.72777E−10 | C36 | −1.03430E−13 | C54 | 0.00000E+00 | | |

TABLE 14

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Free-form surface | 7.045 | 22.397 | 30.974 | 1.945 | −13.108 | 0.890 |
| 3 | Free-form surface | −10.138 | 87.640 | −41.130 | −21.652 | −12.395 | −4.389 |
| 4 | Toroidal | −28.813 | 29.813 | 232.960 | 57.727 | −10.200 | 8.929 |
| 5 | | −17.199 | −635.508 | 674.614 | 123.092 | 0.655 | 20.204 |

Example 7

TABLE 15

| Surface number | X-curvature | Y-curvature |
|---|---|---|
| 2 | 603.2021 | 2654.4 |

TABLE 16

| Surface number | | | Polynomial coefficient | | | | |
|---|---|---|---|---|---|---|---|
| 3 | C1 | 0.00000E+00 | C19 | 4.87235E−12 | C37 | 0.00000E+00 | C55 | 0.00000E+00 |
| | C2 | −3.53809E−02 | C20 | −1.22754E−10 | C38 | 0.00000E+00 | C56 | 0.00000E+00 |
| | C3 | 1.28613E−02 | C21 | 3.76537E−10 | C39 | 0.00000E+00 | C57 | 0.00000E+00 |

TABLE 16-continued

| Surface number | | Polynomial coefficient | | | | | | |
|---|---|---|---|---|---|---|---|---|
| | C4 | 6.92444E−04 | C22 | −2.41643E−14 | C40 | 0.00000E+00 | C58 | 0.00000E+00 |
| | C5 | 5.21278E−06 | C23 | 5.70609E−14 | C41 | 0.00000E+00 | C59 | 0.00000E+00 |
| | C6 | 2.72060E−04 | C24 | −1.55312E−13 | C42 | 0.00000E+00 | C60 | 0.00000E+00 |
| | C7 | −3.35289E−07 | C25 | 5.63778E−13 | C43 | 0.00000E+00 | C61 | 0.00000E+00 |
| | C8 | −2.38015E−07 | C26 | −1.72194E−12 | C44 | 0.00000E+00 | C62 | 0.00000E+00 |
| | C9 | −1.86100E−07 | C27 | 3.64513E−12 | C45 | 0.00000E+00 | C63 | 0.00000E+00 |
| | C10 | −1.06353E−06 | C28 | −6.10356E−12 | C46 | 0.00000E+00 | C64 | 0.00000E+00 |
| | C11 | 2.39274E−09 | C29 | 0.00000E+00 | C47 | 0.00000E+00 | C65 | 0.00000E+00 |
| | C12 | −1.23325E−10 | C30 | 0.00000E+00 | C48 | 0.00000E+00 | C66 | 0.00000E+00 |
| | C13 | 5.27888E−09 | C31 | 0.00000E+00 | C49 | 0.00000E+00 | | |
| | C14 | −7.12437E−09 | C32 | 0.00000E+00 | C50 | 0.00000E+00 | | |
| | C15 | 1.34163E−08 | C33 | 0.00000E+00 | C51 | 0.00000E+00 | | |
| | C16 | 9.51762E−13 | C34 | 0.00000E+00 | C52 | 0.00000E+00 | | |
| | C17 | −1.46362E−11 | C35 | 0.00000E+00 | C53 | 0.00000E+00 | | |
| | C18 | 9.29390E−12 | C36 | 0.00000E+00 | C54 | 0.00000E+00 | | |

TABLE 17

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Toroidal | −1.836 | 2.033 | 48.083 | −30.835 | 2.234 | 0.577 |
| 3 | Free-form surface | 1.602 | 116.142 | −7.383 | −41.903 | 2.082 | 0.995 |
| 4 | Toroidal | 12.044 | 5.809 | 556.018 | 43.684 | 5.817 | 2.521 |
| 5 | | 203.349 | −755.414 | 511.993 | 109.093 | 6.642 | −8.320 |

Example 8

TABLE 18

| Surface number | | Polynomial coefficient | | | | | | |
|---|---|---|---|---|---|---|---|---|
| 2 | C1 | 0.00000E+00 | C19 | −3.35093E−08 | C37 | 4.64867E−18 | C55 | 0.00000E+00 |
| | C2 | −6.57571E−02 | C20 | −4.47809E−08 | C38 | 2.62063E−13 | C56 | 0.00000E+00 |
| | C3 | −4.62022E−03 | C21 | 3.65465E−08 | C39 | −2.32728E−13 | C57 | 0.00000E+00 |
| | C4 | 4.20899E−04 | C22 | −7.12345E−10 | C40 | −1.72566E−12 | C58 | 0.00000E+00 |
| | C5 | 3.31024E−04 | C23 | −7.68166E−10 | C41 | −1.30769E−12 | C59 | 0.00000E+00 |
| | C6 | −2.15702E−03 | C24 | 3.18443E−10 | C42 | 1.36316E−13 | C60 | 0.00000E+00 |
| | C7 | 3.14987E−05 | C25 | 1.59290E−09 | C43 | −3.87410E−12 | C61 | 0.00000E+00 |
| | C8 | −1.70716E−05 | C26 | 2.88191E−09 | C44 | −5.36870E−12 | C62 | 0.00000E+00 |
| | C9 | 1.38602E−05 | C27 | 2.36459E−09 | C45 | 3.92007E−12 | C63 | 0.00000E+00 |
| | C10 | 1.66481E−05 | C28 | −1.48624E−09 | C46 | 0.00000E+00 | C64 | 0.00000E+00 |
| | C11 | 5.55736E−08 | C29 | 1.11929E−11 | C47 | 0.00000E+00 | C65 | 0.00000E+00 |
| | C12 | −6.23406E−08 | C30 | −7.08850E−12 | C48 | 0.00000E+00 | C86 | 0.00000E+00 |
| | C13 | −4.48889E−07 | C31 | 3.58639E−11 | C49 | 0.00000E+00 | | |
| | C14 | −8.94241E−07 | C32 | 3.21771E−11 | C50 | 0.00000E+00 | | |
| | C15 | −6.91527E−07 | C33 | 1.22466E−11 | C51 | 0.00000E+00 | | |
| | C16 | −2.06883E−08 | C34 | 6.76941E−11 | C52 | 0.00000E+00 | | |
| | C17 | 7.39764E−09 | C35 | 9.53552E−11 | C53 | 0.00000E+00 | | |
| | C18 | −1.73937E−08 | C36 | −8.49188E−11 | C54 | 0.00000E+00 | | |
| 3 | C1 | 0.00000E+00 | C19 | 7.36894E−11 | C37 | 0.00000E+00 | C55 | 0.00000E+00 |
| | C2 | 1.05136E−01 | C20 | −1.83107E−10 | C38 | 0.00000E+00 | C56 | 0.00000E+00 |
| | C3 | −9.03206E−03 | C21 | −5.31482E−10 | C39 | 0.00000E+00 | C57 | 0.00000E+00 |
| | C4 | 3.19326E−03 | C22 | −8.61567E−14 | C40 | 0.00000E+00 | C58 | 0.00000E+00 |
| | C5 | 3.35742E−05 | C23 | −2.91138E−13 | C41 | 0.00000E+00 | C59 | 0.00000E+00 |
| | C6 | 2.55373E−03 | C24 | −3.14511E−13 | C42 | 0.00000E+00 | C60 | 0.00000E+00 |
| | C7 | 1.46521E−06 | C25 | −4.12771E−13 | C43 | 0.00000E+00 | C61 | 0.00000E+00 |
| | C8 | −1.06354E−06 | C26 | −6.36879E−12 | C44 | 0.00000E+00 | C62 | 0.00000E+00 |
| | C9 | 1.19716E−06 | C27 | −2.56930E−11 | C45 | 0.00000E+00 | C63 | 0.00000E+00 |
| | C10 | −3.22353E−07 | C28 | −3.20213E−11 | C46 | 0.00000E+00 | C64 | 0.00000E+00 |
| | C11 | 8.49822E−09 | C29 | 0.00000E+00 | C47 | 0.00000E+00 | C65 | 0.00000E+00 |
| | C12 | −1.76954E−09 | C30 | 0.00000E+00 | C48 | 0.00000E+00 | C66 | 0.00000E+00 |
| | C13 | 1.83426E−08 | C31 | 0.00000E+00 | C49 | 0.00000E+00 | | |
| | C14 | 2.01842E−08 | C32 | 0.00000E+00 | C51 | 0.00000E+00 | | |
| | C15 | 4.03481E−08 | C33 | 0.00000E+00 | C51 | 0.00000E+00 | | |
| | C16 | −9.97452E−12 | C34 | 0.00000E+00 | C52 | 0.00000E+00 | | |
| | C17 | −4.38612E−11 | C35 | 0.00000E+00 | C53 | 0.00000E+00 | | |
| | C18 | 2.75237E−11 | C36 | 0.00000E−00 | C54 | 0.00000E+00 | | |

TABLE 19

| Surface number | Shape | Eccentric data | | | | | |
|---|---|---|---|---|---|---|---|
| | | X | Y | Z | ADE | BDE | CDE |
| 1 | | 0 | 0 | 0 | 0 | 0 | 0 |
| 2 | Free-form surface | −0.477 | 4.508 | 19.660 | −36.499 | 3.118 | −0.887 |
| 3 | Free-form surface | 5.643 | 130.971 | 6.704 | −59.994 | 3.213 | 0.429 |
| 4 | Toroidal | −101.437 | 2.506 | 198.814 | 30.423 | −6.255 | −15.582 |
| 5 | | −359.723 | −706.261 | 310.727 | 105.859 | −18.828 | 9.605 |

Table 20 illustrates examples of the display size of the image, the virtual image size, and the distance from the user's viewpoint to the virtual image in Examples 1 to 6. Table 21 illustrates examples of numerical values derived from parameters of D12: the interval between first mirror 13 and second mirror 14, Lv: the longitudinal length (T×tan θ) of virtual image 40, T: the distance from the pupil of user 30 to virtual image 40 in FIG. 7.

TABLE 20

| | | Example 1 | Example 2 | Example 3 | Example 4 | Example 5 | Example 6 |
|---|---|---|---|---|---|---|---|
| Display size | X | 97.6 | 97.6 | 100.0 | 100.0 | 40.9 | 14.4 |
| | Y | 36.6 | 36.6 | 50.0 | 50.0 | 20.5 | 38.4 |
| Virtual image size | X | 420.0 | 420.0 | 540.0 | 540.0 | 252.0 | 300.0 |
| | Y | 157.5 | 157.5 | 270.0 | 270.0 | 126.0 | 112.5 |
| Distance between pupil and virtual image | | 2100 | 2100 | 2700 | 2700 | 2100 | 2500 |

TABLE 21

| | Example 1 | Example 2 | Example 3 | Example 4 | Example 5 | Example 6 |
|---|---|---|---|---|---|---|
| D12/Lv | 0.84 | 0.86 | 0.61 | 0.61 | 0.69 | 0.90 |
| √(T × Lv)/Yv | 0.10 | 0.10 | 0.05 | 0.05 | 0.16 | 0.20 |

The present technology is suitable for the display apparatus, such as the on-vehicle headup display, in which the high image quality is required.

What is claimed is:

1. A display apparatus comprising a display unit that projects an image to a light transmissive display member, the display apparatus forming a virtual image of the image projected by the display unit on an opposite side to a user side with respect to the display member, wherein
the display unit is configured to accommodate a display device that displays the image and a projection optical system that projects the image displayed on the display device to the display member in a housing including an opening through which projected light is output,
the projection optical system includes a first reflecting member disposed on a display device side and a second reflecting member disposed on an opening side in an optical path extending from the display device to the opening,
a reflection surface of the first reflecting member that reflects the image displayed on the display device has a convex shape surface, and a reflection surface of the second reflecting member that projects the image to the display member has a concave shape of a free-form surface,
an interval D12 between the first reflecting member and the second reflecting member and an interval DL1 between the first reflecting member and the image of the display device satisfy a relation of 3.0<D12/DL1<10.0 in the display unit,
the opening of the housing includes a first end formed at a rim on a first reflecting member side of the opening and a second end formed at a rim on a second reflecting member side of the opening, and
a display surface of the display device, where the image is displayed on the display device, is disposed so as to be located on the first reflecting member side with respect to a straight line connecting the first end and the second end.

2. The display apparatus according to claim 1, wherein the opening of the housing further includes:
a first light shielding section provided at the rim on the first reflecting member side of the opening; and
a second light shielding section provided at the rim on the second reflecting member side of the opening and having a shape raised from the housing,
the first light shielding section includes the first end, the second light shielding section includes the second end.

3. The display apparatus according to claim 1, wherein the convex shape surface of the reflection surface of the first reflecting member has a rotationally asymmetric convex shape.

4. The display apparatus according to claim 1, wherein the convex shape surface of the reflection surface of the first reflecting member is a convex shape of a free-form surface.

5. The display apparatus accordingly to claim 1, wherein the interval D12 between the first reflecting member and the second reflecting member and the interval DL1 between the first reflecting member and the image of the display device satisfy a relation of 5.0<D12/DL1<8.0.

6. A display unit that forms a virtual image of an image by projecting the image to a light transmissive display member, the display unit comprising:
a housing including an opening through which projected light is output;
a display device that is accommodated in the housing and displays the image; and
a projection optical system that is accommodated in the housing and projects the image displayed on the display device to the light transmissive display member, wherein
the projection optical system includes a first reflecting member disposed on a display device side and a second reflecting member disposed on an opening side in an optical path from the display device to the opening,
a reflection surface of the first reflecting member that reflects the image displayed on the display device has a convex shape surface, and a reflection surface of the second reflecting member that projects the image to the display member has a concave shape of a free-form surface,
an interval D12 between the first reflecting member and the second reflecting member and an interval DL1 between the first reflecting member and the image of the display device satisfy a relation of 3.0<D12/DL1<10.0,
the opening of the housing includes a first end formed at a rim on a first reflecting member side of the opening and a second end formed at a rim on a second reflecting member side of the opening, and
a display surface of the display device, where the image is displayed on the display device, is disposed so as to be located on the first reflecting member side with respect to a straight line connecting the first end and the second end.

7. The display unit according to claim 6, wherein the opening of the housing further includes:
a first light shielding section provided at the rim on the first reflecting member side of the opening; and
a second light shielding section provided at the rim on the second reflecting member side of the opening and having a shape raised from the housing,
the first light shielding section includes the first end, the second light shielding section includes the second end.

8. The display unit according to claim 6, wherein the convex shape surface of the reflection surface of the first reflecting member has a rotationally asymmetric convex shape.

9. The display unit according to claim 6, wherein the convex shape surface of the reflection surface of the first reflecting member is a convex shape of a free-form surface.

* * * * *